H. Crane.
Making Artificial Teeth.

N°. 86,972.   Patented Feb. 16, 1869.

Witnesses
A Bennerendorf
Wm A Morgan

Inventor
H. Crane
per Munn & Co
Attorneys

HENRY CRANE, OF NEW YORK, N. Y.

Letters Patent No. 86,972, dated February 16, 1869.

IMPROVED MODE OF CONNECTING ARTIFICIAL TEETH WITH DENTAL PLATES.

The Schedule referred to in these Letters Patent and making part of the same.

*To all whom it may concern:*

Be it known that I, HENRY CRANE, of the city, county, and State of New York, have invented a new and useful Improvement in Connecting Artificial Teeth to Base or Palate-Plates; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to furnish a more simple, convenient, effective, and reliable mode of connecting artificial teeth to base or palate-plates; and It consists in doing this by means of headed hard-rubber dowel-pins, or standards, as hereinafter more fully described.

The various operations of preparing the plates and setting the teeth are conducted in the ordinary manner.

Figure 2:
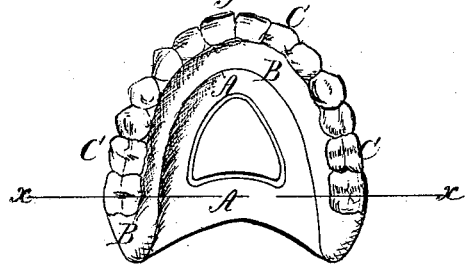
Figure 2 is a face view of the same.
Figure 3:
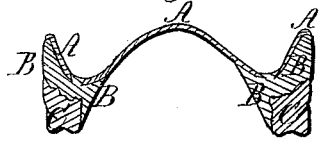
Figure 3 is a sectional view of the same, taken through the line $x\,x$, fig. 2.

A is the metallic base, or palate-plate, in that part of which, that is covered upon one or both sides with the hard-rubber base, B, is formed one or more rows or series of holes, which holes are countersunk upon one side of said plate A, as shown in fig. 2.

Figure 1:
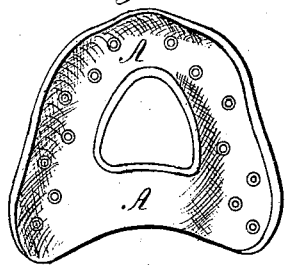
Figure 1 is an inner side view of a set of teeth, illustrating my improvement.

By this construction, when the rubber is vulcanized in the flask, the said rubber may be forced through the said holes, as shown in figs. 1 and 2, forming hard-rubber standards, with heads, or enlarged parts, pressed into the said counter-sinks, which prevent them from being drawn out of the said plates A, thus securely connecting the teeth C and hard-rubber base, B, to the said metallic plates A, said rubber standards forming an integral part of said rubber base, B.

This improvement is applicable to any metallic base or palate-plate, but is especially applicable to aluminum plates, with which metal it has been found impossible to use solder.

I am aware that rubber bases have heretofore been connected to metallic dental plates by means of tongues, or projections, formed on such plates, and embedded in the rubber; but as these form no part of my invention, I do not claim; but, having thus described my invention,

I claim as new, and desire to secure by Letters Patent—

As a new article of manufacture, the palate-plate A and rubber base B, connected by the dowel-pins $a$ projecting through the perforations $b$ in said plate, and formed with heads fitting in counter-sinks in the same, as herein described.

The above specification of my invention signed by me, this 17th day of November, 1868.

H. CRANE.

Witnesses:
FRANK BLOCKLEY,
JAMES T. GRAHAM.